(12) United States Patent
Nien et al.

(10) Patent No.: US 10,103,632 B2
(45) Date of Patent: *Oct. 16, 2018

(54) ENHANCED PHASE CONTROL CIRCUIT AND METHOD FOR A MULTIPHASE POWER CONVERTER

(71) Applicant: Richtek Technology Corporation, Zhubei, Hsinchu County (TW)

(72) Inventors: Hung-Shou Nien, Changhua (TW); Ting-Hung Wang, Taipei (TW); Cheng-Ching Hsu, Taoyuan (TW); Shang-Ying Chung, Miaoli County (TW)

(73) Assignee: RICHTEK TECHNOLOGY CORP., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,994

(22) Filed: Sep. 20, 2016

(65) Prior Publication Data

US 2017/0019026 A1   Jan. 19, 2017

Related U.S. Application Data

(63) Continuation-in-part of application No. 13/447,563, filed on Apr. 16, 2012, now Pat. No. 9,461,544.

(30) Foreign Application Priority Data

Apr. 18, 2011   (TW) .............................. 100113353 A

(51) Int. Cl.
*H02M 3/158* (2006.01)
*H02M 1/00* (2006.01)

(52) U.S. Cl.
CPC .. *H02M 3/1584* (2013.01); *H02M 2001/0032* (2013.01); *H02M 2001/0048* (2013.01);
(Continued)

(58) Field of Classification Search
CPC ....... H02M 3/1584; H02M 2003/1586; H02M 2001/0048; H02M 2001/0032; H04B 2215/069; Y02B 70/1491; Y02B 70/16
(Continued)

(56) References Cited

U.S. PATENT DOCUMENTS 4,959,764 A   9/1990   Bassett
5,066,900 A   11/1991   Bassett
(Continued)

FOREIGN PATENT DOCUMENTS

JP   H03113986 A   5/1991
JP   H0442771 A    2/1992

*Primary Examiner* — Jue Zhang
*Assistant Examiner* — Jye-June Lee
(74) *Attorney, Agent, or Firm* — Muncy, Geissler, Olds & Lowe, P.C.

(57) ABSTRACT

A multiphase power converter has a plurality of phase circuits, each of which provides a phase current when being active. During single-phase operation of the multiphase power converter, an enhanced phase control circuit and method monitor the summation of the phase currents, and when the summation becomes higher than a threshold, switch the multiphase power converter to a higher power zone to increase the number of active phases. A high efficiency and high reliability multiphase power converter is thus accomplished.

4 Claims, 7 Drawing Sheets

(52) U.S. Cl.
CPC ............... *H02M 2003/1586* (2013.01); *H04B 2215/069* (2013.01); *Y02B 70/1491* (2013.01); *Y02B 70/16* (2013.01)

(58) Field of Classification Search
USPC .................................. 323/271, 272, 282, 234
See application file for complete search history.

(56) References Cited

U.S. PATENT DOCUMENTS

| | | | |
|---|---|---|---|
| 5,215,809 A | 6/1993 | Hoso et al. | |
| 6,674,274 B2 | 1/2004 | Hobrecht et al. | |
| 7,122,995 B2* | 10/2006 | Hasegawa | H02M 3/1584 323/272 |
| 7,492,134 B2* | 2/2009 | Tang | H02M 3/1584 323/241 |
| 7,812,581 B2* | 10/2010 | Qiu | H02M 3/1584 323/272 |
| 7,889,525 B2* | 2/2011 | Moussaoui | H02M 3/1584 323/268 |
| 7,919,955 B2* | 4/2011 | Tang | H02M 3/1584 323/272 |
| 8,085,015 B2* | 12/2011 | Lee | H02M 3/1584 323/213 |
| 8,193,796 B2* | 6/2012 | Tang | H02M 3/1584 323/272 |
| 8,228,049 B2 | 7/2012 | Qiu et al. | |
| 8,242,759 B2* | 8/2012 | Carroll | G06F 1/26 323/272 |
| 8,525,500 B1* | 9/2013 | Martin | H02M 3/156 323/283 |
| 2006/0164050 A1* | 7/2006 | Hasegawa | H02M 3/1584 323/272 |
| 2007/0013350 A1* | 1/2007 | Tang | H02M 3/1584 323/237 |
| 2007/0291520 A1 | 12/2007 | Schuellein | |
| 2008/0266918 A1 | 10/2008 | Vilain et al. | |
| 2010/0066319 A1 | 3/2010 | Qiu et al. | |
| 2010/0320983 A1 | 12/2010 | Wu et al. | |
| 2011/0221408 A1* | 9/2011 | Martin | H02M 3/157 323/272 |

* cited by examiner

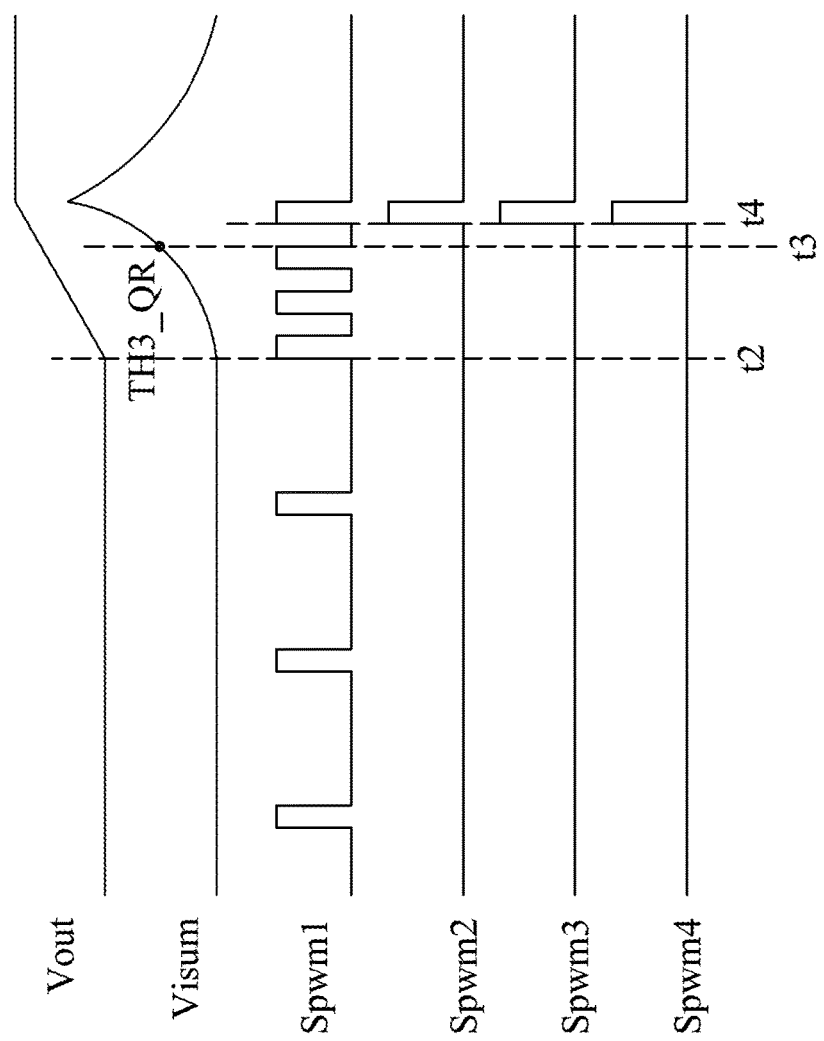

ENHANCED PHASE CONTROL CIRCUIT AND METHOD FOR A MULTIPHASE POWER CONVERTER

CROSS-REFERENCE TO RELATED APPLICATION

The present application is a Continuation-in-Part of U.S. patent application Ser. No. 13/447,563, filed 16 Apr. 2012, which claims the priority benefit of Taiwan Patent Application No. 100113353, filed 18 Apr. 2011, all of which are incorporated herein by reference in their entireties.

FIELD OF THE INVENTION

The present invention is related generally to a power converter and, more particularly, to a phase control circuit and method for a multiphase power converter.

BACKGROUND OF THE INVENTION

Typically, multiphase parallel DC/DC converters are used to implement the power supplies for devices that require low-voltage and high-current supply, such as central processing units (CPUs). Especially, for devices subject to stricter specifications, the power supplies are further required to provide active voltage positioning (AVP) function. In low-voltage and high-current applications, multiphase parallel DC/DC converters can increase heavy-load conversion efficiency, while they are disadvantageous with poor efficiency at light-load. For multiphase parallel DC/DC converters to have high conversion efficiency at both light-load and heavy-load, dynamic phase control is proposed. For example, U.S. Pat. No. 6,674,274 detects the output current value by monitoring the output voltage variation caused by AVP. According to the AVP principle, the output voltage decreases responsive to an increased output current, and the converter system is switched to multiphase operation for increasing the heavy-load conversion efficiency; on the contrary, the output voltage increases responsive to a decreased output current, and the converter system is switched to single-phase operation for increasing the light-load conversion efficiency. Alternatively, U.S. Pat. No. 7,492,134 detects the output current value by monitoring the phase currents of the converter system for determining the number of active phases. When the phase current increases, the number of active phases gradually increases, and when the phase current decreases, the number of active phases gradually decreases. Additionally, when detecting instant drop of the output voltage, the converter system immediately enables all of the phases to accelerate phase change and in turn prevent undesired over-current protection or system damage.

A phase current may suddenly increase due to, for example, an increased output current, a reduced DC load line, or a highly sloped output voltage variation, etc, where the DC load line refers to the voltage drop caused by AVP. All conventional solutions are to change the number of active phases according to the output current value, and thus the speed of changing the number of active phases depends on the speed of current sensing. When the speed of current sensing in the converter system is too high, shift of the output current level and misoperation tends to happen. On the contrary, when the speed of current sensing in the converter system is too low, unnecessary over-current protection or damage may happen. Referring to FIG. 1, the changing slope of a phase current may be divided into three areas A1, A2 and A3, in which the phase current changes fastest in the area A1, slower in the area A2 and slowest in the area A3. The existing methods can only instantly deal with conditions of the phase current with a changing slope in the area A1 or A3 to determine an appropriate number of active phases, and thus, during single-phase operation of the converter system in steady, if the phase current suddenly increases with a changing slope in the area A2, the converter system will not timely switch from the single-phase operation to multiphase operation, which may cause unnecessary over-current protection or system damage.

Therefore, it is desired an enhanced phase control circuit and method to deal with conditions of the phase current with a medium changing speed.

SUMMARY OF THE INVENTION

An objective of the present invention is to provide an enhanced phase control circuit and method to deal with the medium current varying speed.

According to the present invention, an enhanced phase control circuit for a multiphase power converter includes a state machine for determining power zones of the multiphase power converter and a current quick response power zone up circuit that during single-phase operation of the multiphase power converter, when a phase current becomes greater than a threshold, signals the state machine to switch the power zones to increase operational phases, thereby improving the multiphase power converter in both conversion efficiency and reliability. Different power zones have different operational phases.

According to the present invention, an enhanced phase control method for a multiphase power converter includes detecting a phase current during single-phase operation of the multiphase power converter, and when the phase current is greater than a threshold, switching power zones of the multiphase power converter for increasing operational phases, thereby improving the multiphase power converter in both conversion efficiency and reliability, wherein different power zones having different operating parameters.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which:

FIG. 7 is a waveform diagram of a multiphase power converter with a current quick response power zone up circuit according to the present invention at reduction of the DC load line of the multiphase power converter.

DETAILED DESCRIPTION OF THE INVENTION

Figure 2:
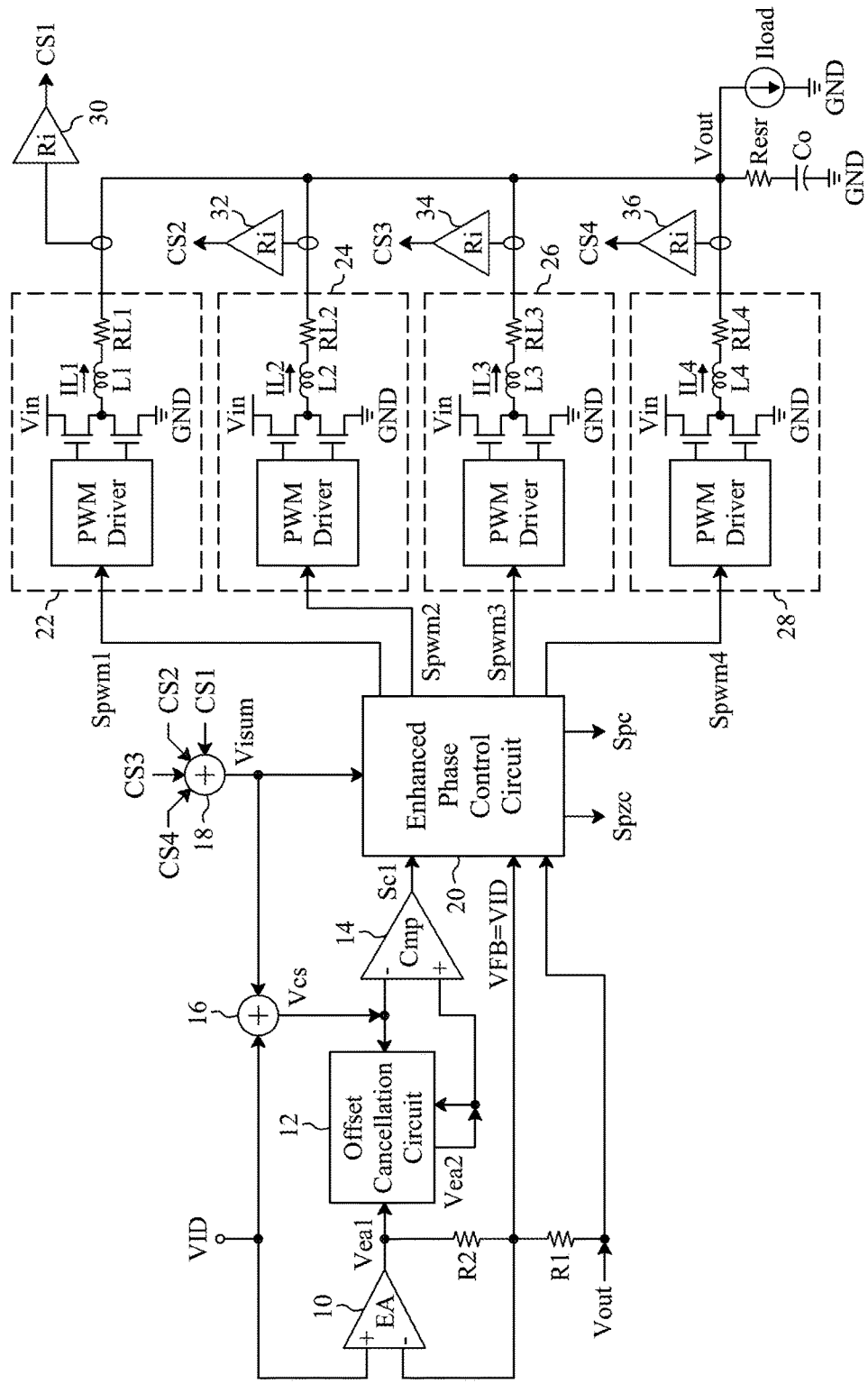
FIG. 2 is a circuit diagram of a multiphase power converter using an enhanced phase control circuit according to the present invention.

As shown in FIG. 2, an enhanced phase control circuit 20 according to the present invention is used in a multiphase power converter, for example, having four phase circuits 22, 24, 26 and 28 for providing phase currents IL1, IL2, IL3 and IL4, respectively. Current sensors 30, 32, 34 and 36 senses the phase currents IL1, IL2, IL3 and IL4 to generate current sense signals CS1, CS2, CS3 and CS4, respectively, a summing circuit 18 combines the current sense signals CS1, CS2, CS3 and CS4 to generate a summed signal Visum, an error amplifier 10 generates an error signal Vea1 according to a feedback voltage VFB related to the output voltage Vout of the power converter and a reference voltage VID which is used for determining the regulated level of the output voltage Vout, a summing circuit 16 combines the reference voltage VID and the summed signal Visum to generate a signal Vcs, an offset cancellation circuit 12 cancels the offset of the error signal Vea1 according to signals Vcs and Vea2 to generate the error signal Vea2, a comparator 14 generates a comparison signal Sc1 according to the signals Vcs and Vea2, and the enhanced phase control circuit 20 provides pulse width modulation (PWM) signals Spwm1, Spwm2, Spwm3 and Spwm4 according to the comparison signal Sc1 for the phase circuits 22, 24, 26 and 28 to control the phase currents IL1, IL2, IL3 and IL4, respectively. In addition, the enhanced phase control circuit 20 further generates a power zone (PZ) control signal Spzc and a phase control signal Spc according to the summed signal Visum, the output voltage Vout and the reference voltage VID, to determine the power zone and the number of active phases, respectively. Different power zones are preset with different operational parameters, such as number of active phases, load line, operational frequency, output voltage droop, etc. When the multiphase power converter is in steady state, due to the virtual short circuit principle, voltages at the two input terminals of the error amplifier 10 are equal to each other, so the feedback voltage VFB can be regarded as the reference voltage VID. Therefore, in this embodiment, the enhanced phase control circuit 20 employs the feedback voltage VFB, instead of the reference voltage VID, for the phase control mechanism.

Figure 1:
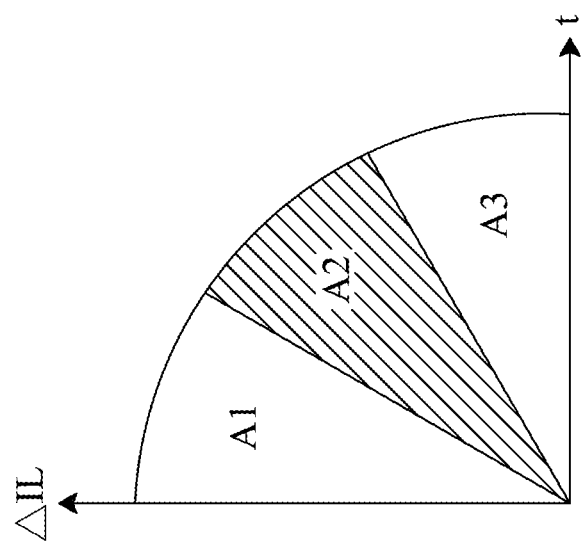
FIG. 1 is a diagram showing the distribution of changing slope of a phase current.
Figure 3:
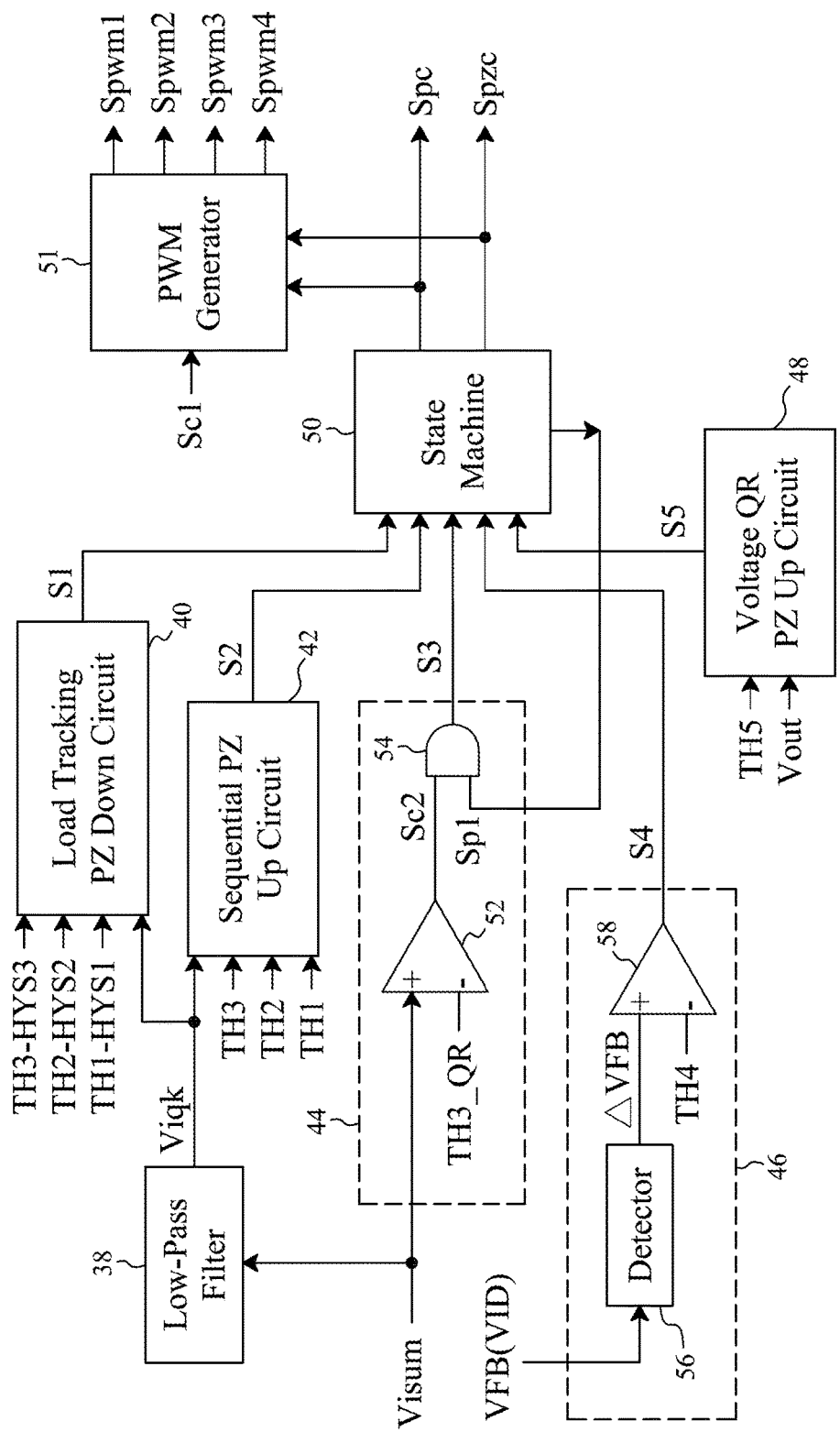
FIG. 3 is a circuit diagram of an embodiment for the enhanced phase control circuit shown in FIG. 2.

FIG. 3 is a circuit diagram of an embodiment for the enhanced phase control circuit 20, which includes a low-pass filter 38, a load tracking power zone (PZ) down circuit 40, a sequential PZ up circuit 42, a current quick response (QR) PZ up circuit 44, a dynamic reference voltage phase up circuit 46, a voltage QR PZ up circuit 48, a state machine 50, and a PWM generator 51. For processing an extensive phase current changing slope, such as the three areas A1, A2 and A3 shown in FIG. 1, a power zone switching mechanism of the enhanced phase control circuit 20 has three parts. The first part relates to slow change power zone, for example the area A3 shown in FIG. 1, which is realized by the load tracking PZ down circuit 40 and the sequential PZ up circuit 42. The second part relates to medium change power zone, for example the area A2 shown in FIG. 1, which is realized by the current QR PZ up circuit 44 and the dynamic reference voltage phase up circuit 46. The third part relates to fast change power zone, for example the area A1 shown in FIG. 1, which is realized by the voltage QR PZ up circuit 48.

Figure 4:
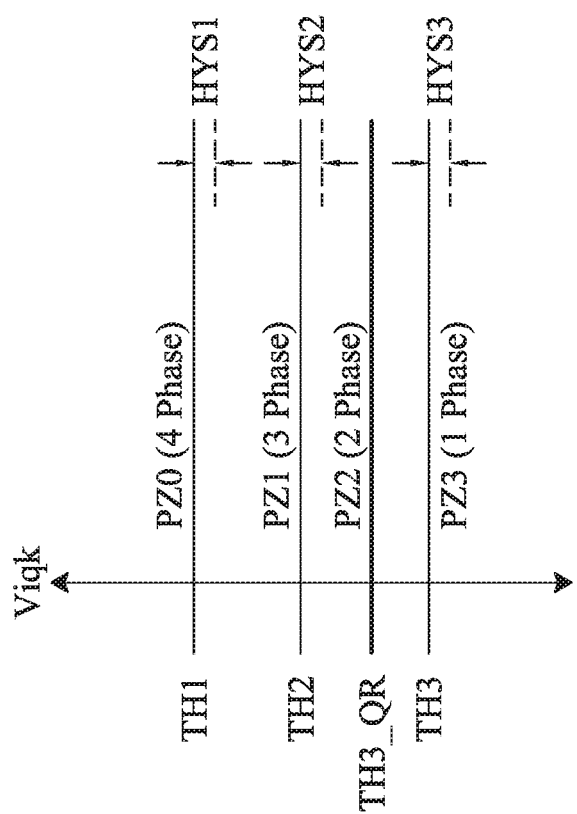
FIG. 4 is a diagram showing threshold and hysteresis definition for power zone determination.

In the enhanced phase control circuit shown in FIG. 3, the low-pass filter 38 filters off the switching ripples and high-frequency noise from the summed signal Visum to generate a DC signal Viqk, and thus the DC signal Viqk is equal to the average of the summed signal Visum, and is useful to identify variation of the output current Iload. The load tracking PZ down circuit 40 generates a signal S1 according to the DC signal Viqk and thresholds TH1-HYS1, TH2-HYS2 and TH3-HYS3. The sequential PZ up circuit 42 generates a signal S2 according to the DC signal Viqk and thresholds TH1, TH2 and TH3. As shown in FIG. 4, in this embodiment, the thresholds TH1, TH2, TH3, TH1-HYS1, TH2-HYS2 and TH3-HYS3 define four power zones PZ0, PZ1, PZ2 and PZ3, in which the power zone PZ0 is preset for four-phase operation, the power zone PZ1 is preset for three-phase operation, the power zone PZ2 is preset for two-phase operation, and the power zone PZ3 is preset for single-phase operation.

The comparison signal Sc1 is provided to the PWM generator 51 for generation of the PWM signals Spwm1, Spwm2, Spwm3 and Spwm4. Generation of one or more PWM signals is well known, and detailed description is omitted herein. The PWM generator 51 will determine how many phases are active depending on the output of the state machine 50.

When the multiphase power converter works in the power zone PZ3, if the DC signal Viqk increases to higher than the threshold TH3, the sequential PZ up circuit 42 triggers the signal S2 to the state machine 50, and the state machine 50 in response thereto switches the multiphase power converter to the power zone PZ2 by the power zone control signal Spzc.

When the multiphase power converter works in the power zone PZ2, if the DC signal Viqk increases to higher than the threshold TH2, the sequential PZ up circuit 42 triggers the signal S2 to the state machine 50, and the state machine 50 in response thereto switches the multiphase power converter to the power zone PZ1 by the power zone control signal Spzc; on the contrary, if the DC signal Viqk decreases to lower than the threshold TH3-HYS3, the load tracking PZ down circuit 40 triggers the signal S1 to the state machine 50, and the state machine 50 in response thereto switches the multiphase power converter to the power zone PZ3 by the power zone control signal Spzc.

When the multiphase power converter works in the power zone PZ1, if the DC signal Viqk increases to higher than the threshold TH1, the sequential PZ up circuit 42 triggers the signal S2 to the state machine 50, and the state machine 50 in response thereto switches the multiphase power converter to the power zone PZ0 by the power zone control signal Spzc; on the contrary, if the DC signal Viqk decreases to lower than the threshold TH2-HYS2, the load tracking PZ down circuit 40 triggers the signal S1 to the state machine 50, and the state machine 50 in response thereto switches the multiphase power converter to the power zone PZ2 by the power zone control signal Spzc.

When the multiphase power converter works in the power zone PZ0, if the DC signal Viqk decreases to lower than the threshold TH1-HYS1, the load tracking PZ down circuit 40 triggers the signal S1 to the state machine 50, and the state machine 50 in response thereto switches the multiphase power converter into the power zone PZ1 by the power zone control signal Spzc.

In the event that the output voltage Vout instantly drops to lower than a threshold TH5, the voltage QR PZ up circuit 48 triggers a signal S5 to the state machine 50, and the state machine 50 in response thereto immediately switches the multiphase power converter to a higher power zone, for example the power zone PZ0, by the power zone control signal Spzc.

Readers are referred to U.S. Pat. No. 7,492,134 for the scheme of the load tracking PZ down circuit 40, the sequential PZ up circuit 42 and the voltage QR PZ up circuit 48, and further detailed description is omitted herein.

Figure 5:
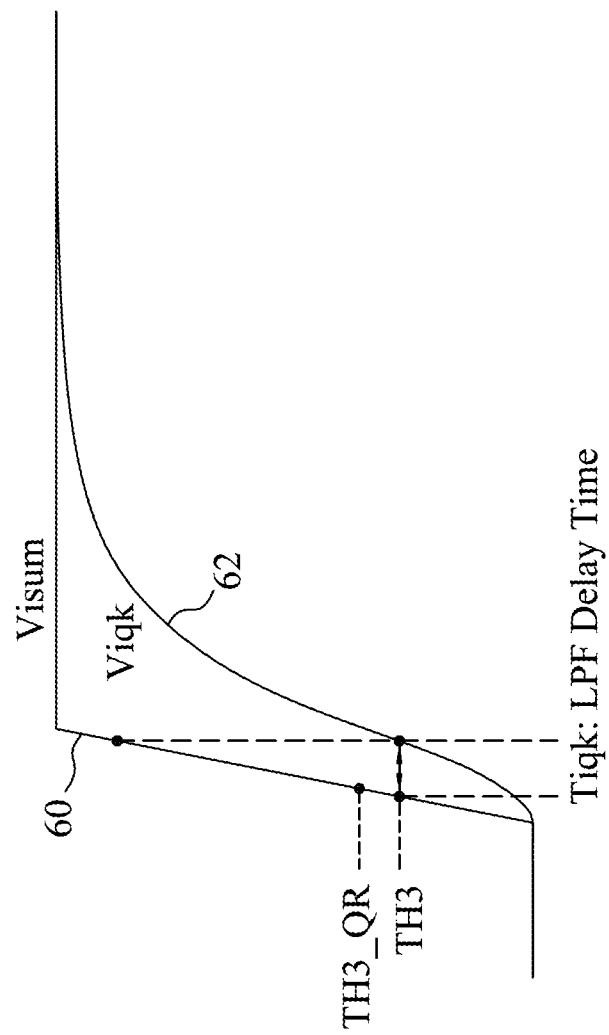
FIG. 5 is a waveform diagram showing the instant change and average of the summed phase currents.

When the multiphase power converter is in single-phase operation, i.e. working in the power zone PZ3, only the phase circuit 22 is enabled and the summed signal Visum is equal to the phase current IL1. If the output current Iload instantly increases and the changing slope of the phase current IL1 is in the area A2 shown in FIG. 1, as shown by waveform 60 of FIG. 5, the summed signal Visum fast increases with the output current Iload, while the DC signal Viqk slower increases due to the delay caused by the low-pass filter 38, as shown by waveform 62. After the summed signal Visum reaches the threshold TH3, the DC signal Viqk will not reach the threshold TH3 until a delay time Tiqk lapses. When the DC signal Viqk reaches the threshold TH3, the summed signal Visum has already increased to a very high level. This possibly triggers single-phase over-current protection or, worse, damages the converter system. To overcome this problem, the current QR PZ up circuit 44 triggers the signal S3 to the state machine 50 when the summed signal Visum increases to the threshold TH3_QR, to immediately switch the multiphase power converter to a higher power zone, for example the power zone PZ2, PZ1 or PZ0. In this embodiment, the current QR PZ up circuit 44 includes a comparator 52 to compare the summed signal Visum with the threshold TH3_QR to generate a comparison signal Sc2, and an AND gate 54 to generate the signal S3 according to the comparison signal Sc2 and the single-phase operation signal Sp1. The single-phase operation signal Sp1 is an internal signal of the enhanced phase control circuit 20, which is asserted by the state machine 50 when the multiphase power converter shown in FIG. 2 is in single-phase operation.

Figure 6:
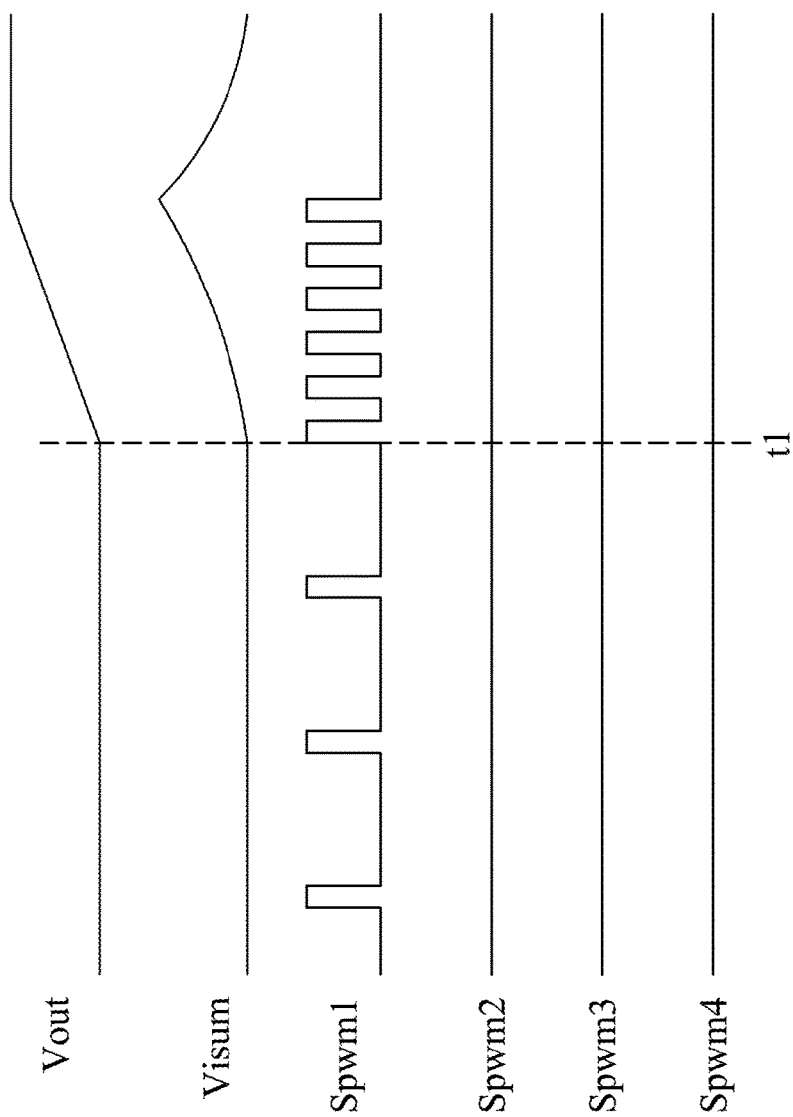
FIG. 6 is a waveform diagram of a conventional multiphase power converter at reduction of the DC load line of the multiphase power converter.

At reduction of the DC load line of the multiphase power converter, converter systems without and with the current QR PZ up circuit 44 will have waveform diagrams as shown in FIGS. 6 and 7, respectively. Referring to FIG. 6, without the current QR PZ up circuit 44, when the multiphase power converter in single-phase operation encounters reduction of the DC load line, as shown at time t1, the output voltage Vout and the summed signal Visum both rise, and the phase circuit 22 has to continuously turn on its upper-bridge switch for six times before the multiphase power converter becomes steady. On the other hand, as shown in FIG. 7, with the current QR PZ up circuit 44 according to the present invention, when the multiphase power converter in single-phase operation encounters reduction of the DC load line, as shown at time t2, the output voltage Vout and the summed signal Visum both rise, and when the summed signal Visum reaches the threshold TH3_QR, as shown at time t3, the current QR PZ up circuit 44 switches the multiphase power converter to the higher power zone PZ0, where the phase circuits 24, 26 and 28 are all enabled, as shown at time t4, so the upper-bridge switch of the phase circuit 22 has only to be turned on for four times before the multiphase power converter becomes steady. Furthermore, in a converter system with the current QR PZ up circuit 44, the phase current IL1 can have its peak transient current far smaller than that in a converter system without the current QR PZ up circuit 44. Assuming that the ripple of the phase current IL1 is 15 A, the difference between the peak transient currents of the phase currents IL1 in the two cases is about 30 A. Therefore, the current QR PZ up circuit 44 is effective in improving the multiphase power converter in reliability and conversion efficiency for both light-load and heavy-load.

Referring to FIG. 3, in this embodiment, the dynamic reference voltage phase up circuit 46 determines the value of the reference voltage VID according to the feedback voltage VFB. When the reference voltage VID increases, the output voltage Vout starts to raise, the phase current will increase to increase the output voltage Vout, and the feedback voltage VFB will increase as well. If the variation ΔVFB of the feedback voltage VFB is greater than a threshold TH4, then the dynamic reference voltage phase up circuit 46 triggers a signal S4 to the state machine 50, and the state machine 50 in response thereto will switch the multiphase power converter to enable all of the phase circuits by the phase control signal Spc. In this embodiment, the dynamic reference voltage phase up circuit 46 includes a detector 56 for detecting the variation ΔVFB of the feedback voltage VFB, and a comparator 58 for comparing the variation ΔVFB with the threshold TH4 to generate the signal S4.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An enhanced phase control circuit for a multiphase power converter having a plurality of phase circuits, each of which is configured to operably provide a phase current when being active, a plurality of current sensors, each of which is configured to operably sense a respective one of each said phase current to generate a current sense signal, a summing circuit configured to operably combine each said current sense signal to generate a summed signal, and an error amplifier configured to operably compare a reference voltage to a feedback voltage related to an output voltage of the multiphase power converter to generate an error signal for regulating the output voltage, the enhanced phase control circuit comprising:

a state machine configured to operate to switch the multiphase power converter between a plurality of power zones for changing a number of active phases in the multiphase power converter;

a current quick response power zone up circuit coupled to the state machine, wherein when the multiphase power converter is in single-phase operation, the current quick response power zone up circuit is configured to operably monitor the summed signal and trigger a first signal for the state machine to switch the multiphase power converter to one of the plurality of power zones to increase the number of active phases if the summed signal is greater than a first threshold; and a dynamic reference voltage phase up circuit coupled to the state machine, configured to operably monitor the feedback voltage for triggering a second signal for the state machine to switch the multiphase power converter to enable all of the plurality of phase circuits responsive to increasing of the reference voltage with an increased variation exceeding a second threshold.

2. The enhanced phase control circuit of claim 1, further comprising:

a low-pass filter coupled to the summing circuit, configured to operably filter the summed signal to generate a DC signal;

a sequential power zone up circuit coupled to the low-pass filter and the state machine, configured to operably trigger a third signal according to the DC signal for the state machine to switch the multiphase power converter to one of the plurality of power zones to increase the number of active phases;

a load tracking power zone down circuit coupled to the low-pass filter and the state machine, configured to operably trigger a fourth signal according to the DC signal for the state machine to switch the multiphase power converter to one of the plurality of power zones to decrease the number of active phases; and a voltage quick response power zone up circuit coupled to the state machine, configured to operably monitor the output voltage for triggering a fifth signal for the state machine to switch the multiphase power converter to one of the plurality of power zones to increase the number of active phases responsive to the output voltage becoming lower than a third threshold.

3. An enhanced phase control method for a multiphase power converter having a plurality of phase circuits, each of which is configured to operably provide a phase current when being active, a plurality of current sensors, each of which is configured to operably sense a respective one of each said phase current to generate a current sense signal, a summing circuit configured to operably combine each said current sense signal to generate a summed signal, and an error amplifier configured to operably compare a reference voltage to a feedback voltage related to an output voltage of the multiphase power converter to generate an error signal for regulating the output voltage, the enhanced phase control method comprising steps of:

switching the multiphase power converter between a plurality of power zones for changing a number of active phases in the multiphase power converter;

during single-phase operation of the multiphase power converter, monitoring the summed signal and switching the multiphase power converter to one of the plurality of power zones to increase the number of active phases if the summed signal is greater than a first threshold; and enabling all of the plurality of phase circuits responsive to increasing of the reference voltage with an increased variation exceeding a second threshold;

wherein different power zones are preset with different operational parameters.

4. The enhanced phase control method of claim 3, further comprising steps of:

low-pass filtering the summed signal to generate a DC signal;

switching the multiphase power converter to one of the plurality of power zones to increase or decrease the number of active phases according to the DC signal; and monitoring the output voltage for switching the multiphase power converter to one of the plurality of power zones to increase the number of active phases responsive to the output voltage becoming lower than a third threshold.

* * * * *